Feb. 23, 1971    F. J. DUMONT    3,565,508
BIREFRINGENT POLARIZING PRISM AND BEAMSPLITTER
AND METHOD OF PRODUCING SAME
Filed April 26, 1968

INVENTOR
FRANK J. DUMONT

BY
ATTORNEYS

United States Patent Office

3,565,508
Patented Feb. 23, 1971

3,565,508
BIREFRINGENT POLARIZING PRISM AND BEAM-SPLITTER AND METHOD OF PRODUCING SAME
Frank J. Dumont, 442 Clay Road,
Rochester, N.Y. 14623
Filed Apr. 26, 1968, Ser. No. 724,542
Int. Cl. G02b 27/28
U.S. Cl. 350—157                                                7 Claims

ABSTRACT OF THE DISCLOSURE

A grown or freshly cleaved layer of a birefringent crystal is positioned between confronting, plane, atomistically clean surfaces of two prism substrates, said surfaces being matched to within 1/10 wave accuracy so that they are disposed in optical contact with opposite sides of the layer, whereby the layer is secured by adhesion between the substrates to form a polarizing prism. The layer of birefringent material may be muscovite mica; and the assembly is made in a dust-free atmosphere to prevent dust particles and the like from being interposed between the mica and glass substrates.

---

Figure 1:
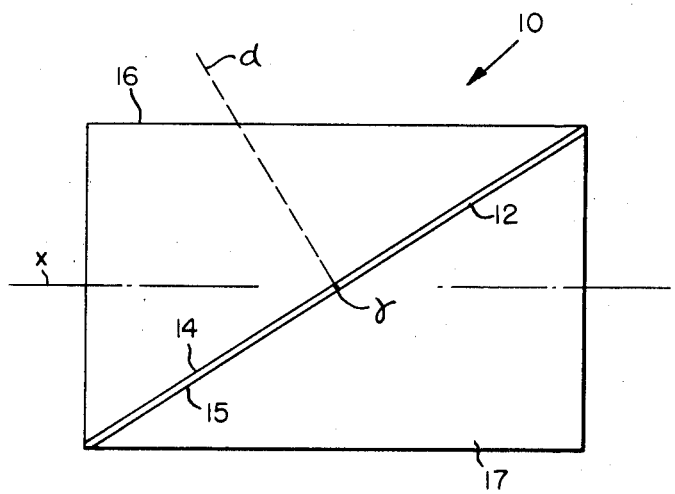

This invention relates to polarizing prisms, and more particularly to a polarizing prism which is particularly adapted for use as a beam splitter in interferometric applications and the like.

Heretofore in the manufacture of most birefringent polarizing prisms it has been customary to employ calcite as the birefringent material, as for example, in the Nicol, and the Glan Thompson type prisms. These and other such prisms employing calcite as the birefringent material have the disadvantage that some form of "cement," such as Canada balsam, or oil of an appropriate refractive index, must be employed either to cement a layer of calcite between two glass prisms, or to cement together two faces of a severed calcite crystal. Calcite, however, has the disadvantages that it is prohibitively expensive when large crystals of high grade optical quality are required; it is fragile and generally requires polishing; and large sheets of calcite of interferometric quality are substantially non-existent. Moreover, satisfactory cements are not available in sufficient variety to satisfy the requirements, which are imposed by the design of a satisfactory polarizing prism, on refractive index, dispersion, and mechanical properties.

Efforts have been made to develop other bonding processes for securing birefringent material between prism faces, as for example, by "growing" a birefringent crystal between two prism faces from a melt at high temperature. This construction, however, raises the problem of maintaining the proper crystal axis direction; and also leaves a high residual strain in the prism upon cooling. Such strain not only limits the polarizance of the prism, but also limits the potential optical quality that can be realized from the birefringent material used. Also, attempts have been made to replace the prisms with liquid cells of appropriate refractive index, but these constructions have required numerous accessories, and the refractive indices have tended to fluctuate with age due to evaporation. This index variation can reduce the acceptance angle of the prism, and degrade its optical quality.

Polarizing prisms, therefore, as heretofore constructed, have not been entirely satisfactory for use as beam splitters in interferometric applications, and in applications where light losses are a problem. The calcite-type polarizers, in addition to being expensive and difficult to manufacture, are not satisfactory for this purpose because they tend to limit the optical quality of the instrument or instruments in which they are used. The Wollaston and Rochon polarizers, which are of the shearing type, produce two beams of plane, polarized light which are orthogonal, but with an angular shear of the two beams. They therefore are not generally used as simple polarizers, because the angular separation between the two polarized beams produced is small, and requires the use of a mechanical obstruction to eliminate one of the beams. This small angular separation of the two polarized beams minimizes their usefulness in double beam applications, and particularly in interferometers.

An object of this invention is to provide an improved polarizing prism, which has exceptionally high polarizance with a minimum of transmission loss, as compared to prior such prisms.

It is another object of this invention to provide an improved polarizing prism, which will function satisfactorily as a beam splitter for interferometric equipment. To this end it is an object to provide an improved polarizing prism, which has one polarized beam exiting the prism in transmission, and the other by total internal reflection.

Another object of this invention is to provide a novel polarizing prism of the type described, which has improved polarizance, and reduced internal strain, and scattering stray light, as compared to prior polarizing prisms. To this end it is an object to eliminate the cement heretofore employed for securing birefringent material in a polarizing prism of the type described.

A still further object of this invention is to provide a novel method for producing a polarizing prism of interferometric quality.

Other objects of the invention will be apparent hereinafter from the specification and from the recital of the appended claims, particularly when read in conjunction with the accompanying drawing.

Figure 2:
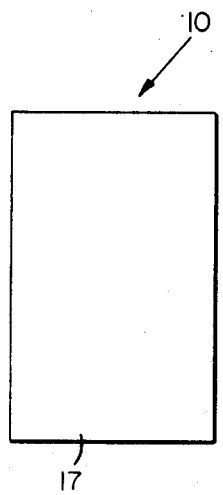

In the drawing:

FIG. 1 is an enlarged, side elevational view of a polarizing prism made in accordance with one embodiment of this invention; and FIG. 2 is an end view of this prism.

Referring now to the drawing by numerals of reference, 10 denotes a polarizing prism or beamsplitter comprising a plane sheet or layer 12 of a birefringent material, for example muscovite mica, secured between the plane faces 14 and 15 of two prism substrates 16 and 17, respectively, with opposed faces of the sheet 12 disposed in optical contact with the surfaces 14 and 15. The two optical axes (not illustrated) of the mica sheet 12 are approximately symmetrical about an imaginary line that extends normal to the sheet 12, as represented in the drawing by the broken line α; and they lie in the plane represented by line α, and by a further line which extends normal to the plane of the drawing as illustrated in the drawing by the dot γ. The mica 12 is oriented so that the principal direction γ is normal to the longitudinal axis x of the prism 10. The prisms 16 and 17 may be made of glass, quartz, or other satisfactory media which is transparent in the spectral region in which the polarizing prism is to transmit.

To prepare the prism 10, the faces 14 and 15 of the prism substrates 16 and 17 are polished flat and cleaned until they match to at least approximately one tenth (1/10) wave accuracy. This accuracy is well within the ability of a master optician. The surfaces 14 and 15 must be atomistically clean, free from dust and foreign particles; and therefore after polishing and cleaning are maintained in a dust-free environment.

The layer 12 of birefringent material, opposite faces of which are also atomistically clean, is then prepared, for example, by peeling outside layers of mica from a sheet thereof that conforms to ASTM IV–I specifications, so that the inside layer thereof, corresponding to the layer 12 in FIG. 1, will have opposed, freshly cleaved surfaces that are scratch-free, and free from cleavage steps. Alternatively, a plane parallel crystal or layer 12 may be grown from a melt of birefringent material other than mica, so that opposite sides of the crystal will be atomistically clean. These steps, which avoid the need for polishing the layer 12, should be performed in a dust-free environment to prevent any contamination of the surfaces of the freshly cleaved or grown layer 12. Preferably layer 12 should be just thick enough to be convenient for processing—for example, approximately 0.0010″ thick.

The atomistically clean faces 14 and 15 of the prisms 16 and 17 are then placed in coplanar engagement with opposite faces, respectively, of the freshly cleaved or grown layer 12, so that the smooth, clean surfaces 14 and 15 are secured by atomic adhesion to, and lie in optical contact with, opposite sides of the layer 12. At the time that the prisms 16 and 17 are placed into contact with the layer 12, prisms 16 and 17 and the layer 12 are preferably at the temperature at which the polarizing prism 10 is to be used, so that no extraneous strain will be developed in the finished prism 10 as the result of subsequent temperature changes. For normal purposes the prisms 16 and 17 and the layer 12 are assembled at room temperature.

It will be understood that the characteristics of isotropy and birefringency of a medium, as used herein, refer to the spectral region in which the material is to be used; that is, isotropic and birefringent for the ultraviolets, visible, infrared, or any other region of the electromagnetic spectrum. The index of the prism should be greater or equal to the ordinary index of mica, which is approximately 1.60. The index of the glass prisms 16 and 17, for example, may be 1.72; and although the resultant index difference of 0.12 for the glass-mica is modest, it can be reduced, if desired, by the the particular glass chosen.

Although in a preferred embodiment the layer 12 has been described as being muscovite mica, it is to be understood that other birefringent mediums, which may be cleaved or grown in plane, parallel layers or laminae, and which facilitate optical contact, may be used.

From the foregoing it will be apparent that applicant has developed a novel method of manufacturing an improved polarizing prism having satisfactory beamsplitting and interferometric characteristics. Applicant's invention obviates the need for employing the cement parameter heretofore utilized for securing birefringent material between two substrates of a polarizing prism. This eliminates the residual strain heretofore introduced into cemented polarizing prisms, and also minimizes the scattering, and stray light produced in such prisms. The total strain in the prism 10 is the inherent strain of the glass and mica employed therein. This can be minimized by the specification requirements of the glass and birefringent material used, and permits approaching a substantially strain-free prism. Moreover, by utilizing a birefringent, laminar material that has highly perfect cleavage, it is possible to attain optical contact between a freshly cleaved sheet of the material and the two prism substrates that are joined thereby. The result is an excellent polarizing prism of interferometric quality.

It is possible also to use a freshly cleaved layer 12 of muscovite mica, or a plane, parallel crystal that is grown from a melt of a different birefringent material, to construct a prism which has less polarizance, or which is only of optical quality, rather than of interferometric quality. In such instance a conventional oil or cement of suitable refractive index is used to secure the layer 12 between the surfaces 14 and 15; and for this prism the surfaces need not be polished to within approximately one tenth (1/10) wave accuracy.

Having thus described my invention, what I claim is:
1. A polarizing prism, comprising
    a pair of prism substrates, each of which has a plane, flat surface, wherein said plane surfaces of each of said pair match to at least 1/10 wave accuracy, and
    a single layer of strain-free birefringent material having opposite sides thereof in optical contact with said surfaces so that said layer of birefringent material is secured between said substrates solely by the atomic adhesion of said surfaces to opposite sides of said layer, at least one of said substrates having an index of refraction equal to or greater than the ordinary index of refraction of the birefringent material, and
    said material being oriented so that its optical axes are disposed symmetrical to the normal to the plane of said layer and in the plane normal to the plane of said layer.
2. A polarizing prism as defined in claim 1, wherein said birefringent material comprises mica.
3. A polarizing prism as defined in claim 1, wherein each of said prism substrates comprises an isotropic material, which is transparent in the spectral region in which the polarizing prisms is to transmit.
4. A polarizing prism as defined in claim 1, wherein each of said prism substrates comprises a material selected from the group consisting of glass and quartz.
5. The method of producing a polarizing prism, comprising
    polishing and cleaning a plane, flat surface on each of two prism substrates until the two surfaces match to within approximately 1/10 wave accuracy when placed in parallel relation to one another,
    preparing a plane, parallel layer of strain-free birefringent material from a supply thereof, so that opposite sides of the layer are scratch-free, and free from dust, and
    securing the layer of birefringent material between said substrates without introducing any thermal or mechanical shock by placing the clean, flat surfaces of said substrates solely in direct optical contact with opposite sides of said layer while the latter are still free from dust.
6. The method as defined in claim 5, including maintaining said cleaned surfaces and scratch-free sides of said layer in a substantially dust-free atmosphere until said layer is secured between said substrates.
7. The method as defined in claim 5, wherein said layer is prepared by cleaving it from a laminar supply of birefringent material.

References Cited

UNITED STATES PATENTS

| | | | |
|---|---|---|---|
| 2,303,906 | 12/1942 | Benford et al. | 350—152X |
| 2,476,014 | 7/1949 | Wright | 350—152 |
| 3,075,869 | 1/1963 | Yamaguti | 350—147X |

DAVID SCHONBERG, Primary Examiner

P. R. MILLER, Assistant Examiner

U.S. Cl. X.R.

350—147, 152, 169